455-617 AU 233 EX
FIP8106 OR 3,192,825
EXAMINER
260
SPECTRALLY CODED OPTICAL TRANSMISSION OF IMAGES
Filed Oct. 18, 1961 4 Sheets-Sheet 1
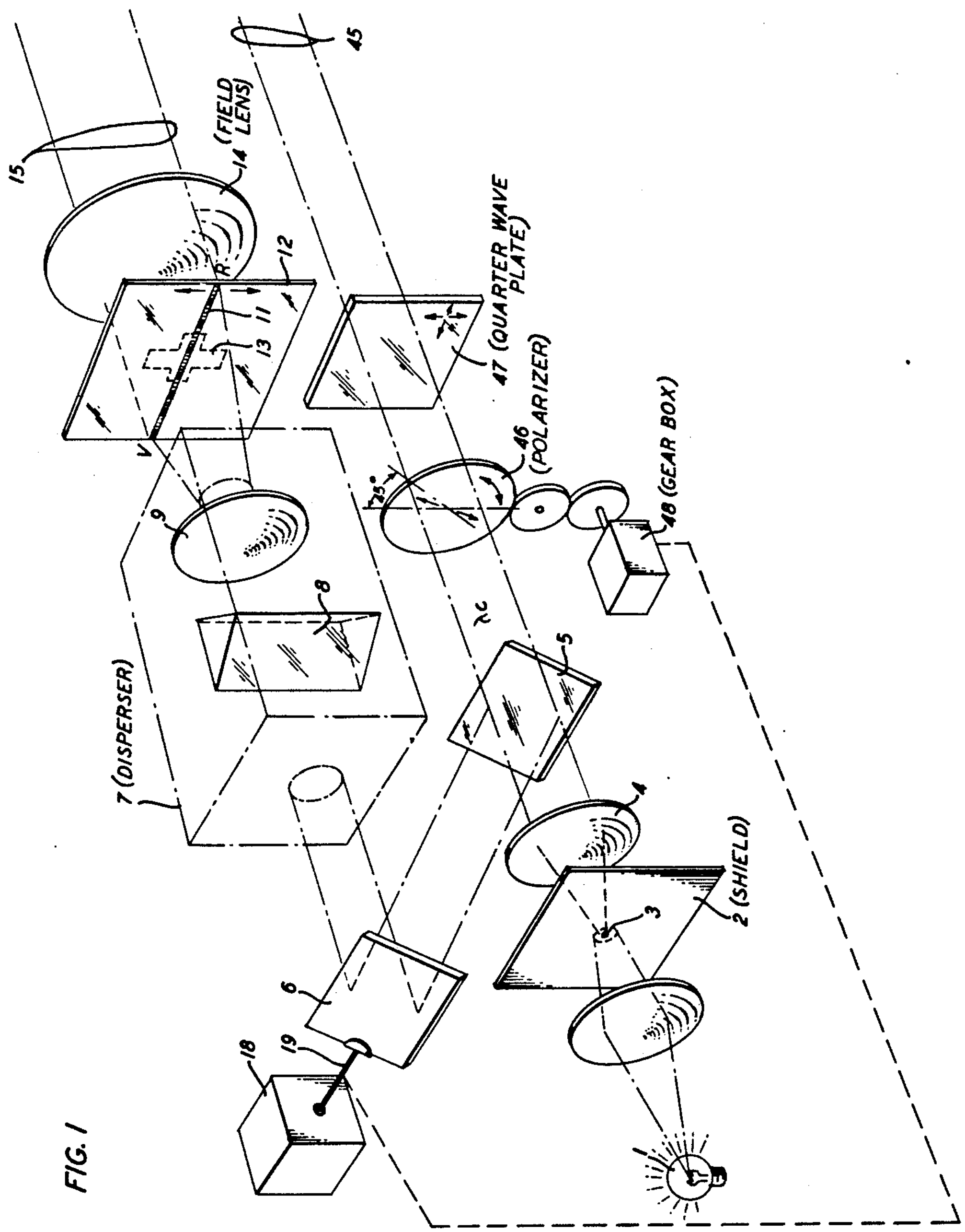
INVENTORS J. S. COURTNEY-PRATT
E. EISNER
BY Harry C. Hart
ATTORNEY July 6, 1965 J. S. COURTNEY-PRATT ETAL 3,192,825
SPECTRALLY CODED OPTICAL TRANSMISSION OF IMAGES
Filed Oct. 18, 1961
4 Sheets-Sheet 2
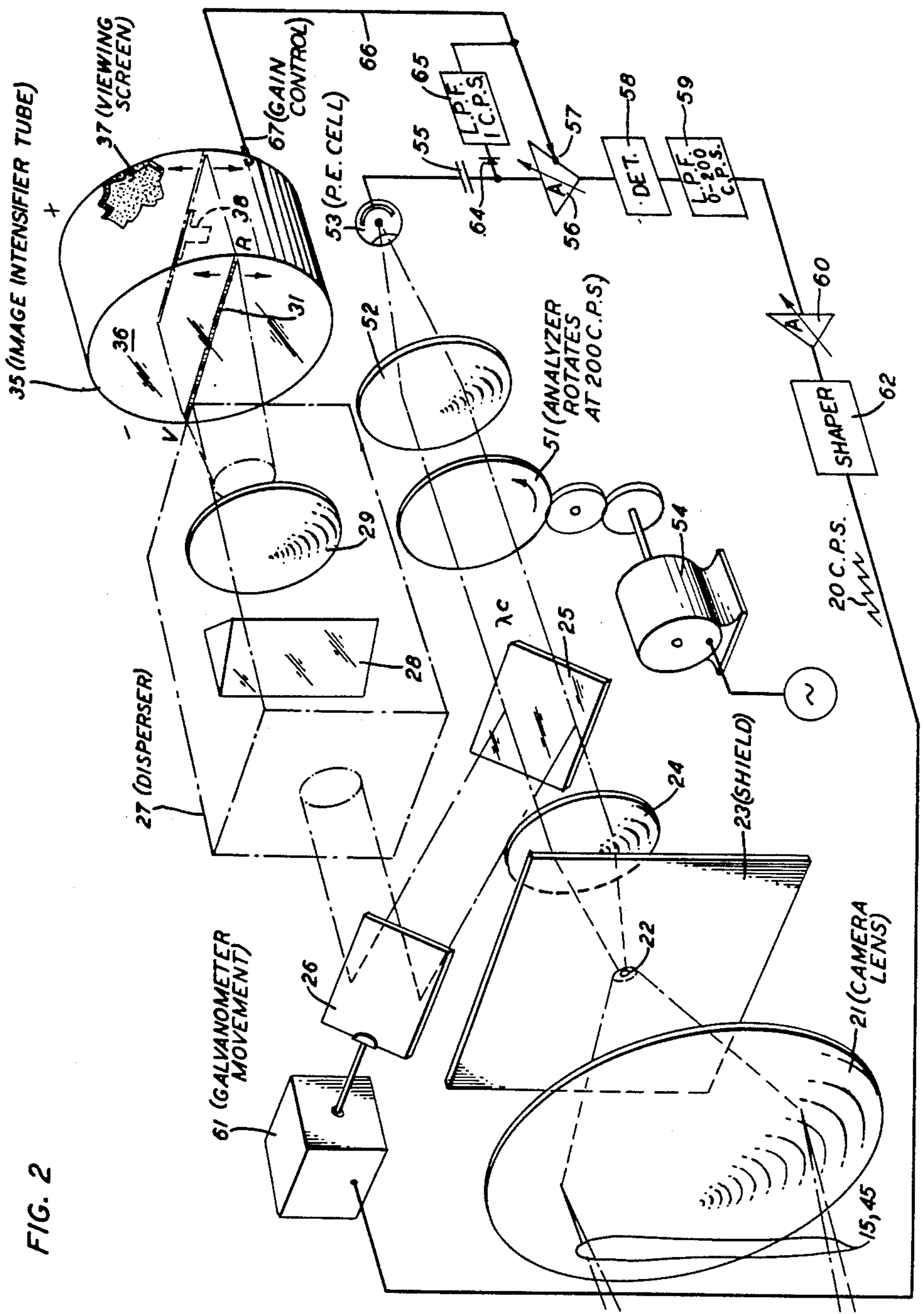
INVENTORS J. S. COURTNEY-PRATT
E. EISNER
BY Harry C. Hart
ATTORNEY SPECTRALLY CODED OPTICAL TRANSMISSION OF IMAGES
Filed Oct. 18, 1961 4 Sheets-Sheet 3
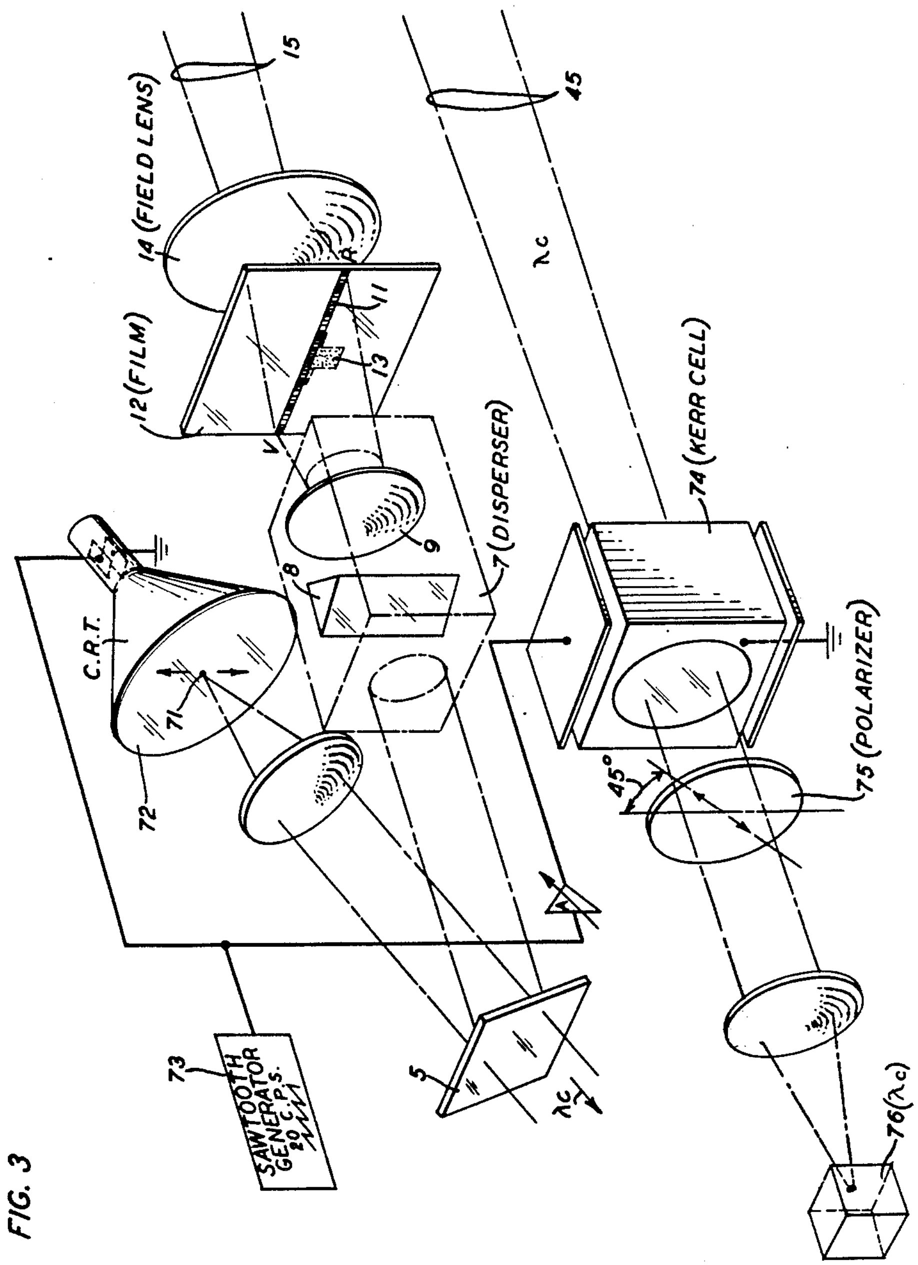
INVENTORS J. S. COURTNEY-PRATT
E. EISNER
BY Harry C. Hart
ATTORNEY SPECTRALLY CODED OPTICAL TRANSMISSION OF IMAGES
Filed Oct. 18, 1961 4 Sheets-Sheet 4
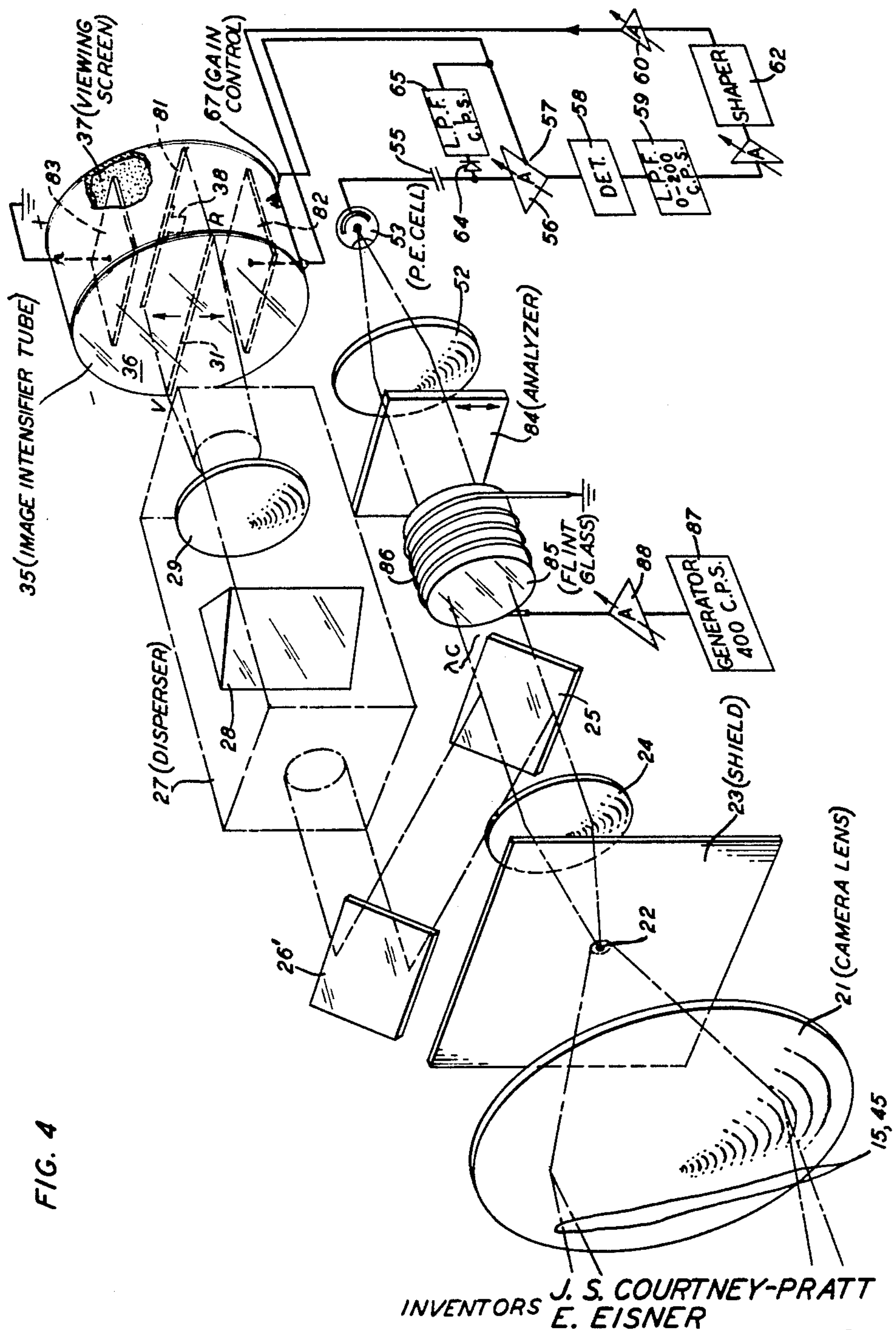
INVENTORS J. S. COURTNEY-PRATT
E. EISNER
BY Harry C. Hart
ATTORNEY United States Patent Office 3,192,825

Patented July 6, 1965

3,192,825
SPECTRALLY CODED OPTICAL TRANSMISSION OF IMAGES

Jeofry S. Courtney-Pratt, Springfield, and Edward Eisner, Bernardsville, N.J., assignors to Bell Telephone Laboratories, Incorporated, New York, N.Y., a corporation of New York Filed Oct. 18, 1961, Ser. No. 145,852
10 Claims. (Cl. 88—1)

This invention deals with the development, at a remote location, of an image of a nearby scene or "object." It has for its principal object the projection of such an image through an optically imperfect medium, e.g., a poor optical system, fog, smoke or heat haze, and to do so without the degradation of detail that accompanies projection through such a medium through the agency of a conventional optical train.

In the development, from a nearby object, of an image at a remote location in the ordinary fashion with a conventional optical train, reliance is placed on perfect rectilinearity of ray propagation in the medium between elements of the train. With the practically perfect lenses that are presently available and with perfect linearity of rays between them, all of the light of each color that originates at a particular point of the object is brought to focus at a single corresponding point of the image, while a nearby point of the image receives only light from a different point of the object, and so on. In this way spatial congruence between object and image is preserved and the image is one of high definition.

But a small amount of optical imperfection in the intervening medium causes deflection of certain of the light rays in a random fashion from their straight line paths and so greatly reduces "resolution"; and loss of resolution makes for a loss of detail in the image.

To escape from this difficulty, A. N. Kartashev has proposed, in Optics and Spectroscopy, vol. 9, No. 3, September 1960 (Russian, page 394; English, page 204) to spread the white light originating in a point source into a spectrum or "rainbow" that is extended in the direction of color dispersion and narrow in the perpendicular direction, and to locate the object whose image is to be developed, e.g., a photographic film, in the same plane as the spectrum. The light that passes through, or is reflected by, each point of a single line of the object is modified in its intensity by the density, or the reflectivity, of the object and is, furthermore, tagged with a particular light wavelength. All of the light thus modified by the several elements of this single object line is gathered, transmitted by a conventional optical train to a remote location, and there projected through a small aperture. The light passing through this aperture is again spread out into a spectrum which now duplicates the variations in density of the object line, albeit in color.

In effect, the proposal is to code spatial locations along a line of the object in terms of light wavelengths; and the advantage is that an intervening medium which may alter the direction of a light ray does not alter its color or wavelength. Thus, while the intensity of the image may be reduced by an intervening light-deflecting medium, its resolution is not affected.

As a practical matter, objects having only one dimension are rare, and the formation of an image of such an object is of minor practical interest. The present invention extends the foregoing suggestion into two dimensions and does so in the following fashion:

The spectrum, which extends in one direction, e.g., horizontally, over the full length of a single line of the object, is so narrow in the perpendicular direction, i.e., the vertical, that variations in the density of the object in the perpendicular direction are inconsequential. This narrow line spectrum is swept, repeatedly and preferably systematically, over the entire area of a two-dimensional object in the perpendicular direction. Thus, during the course of each single sweep, the light of each particular wavelength of the spectrum, that corresponds to a particular coordinate of the object in the first direction, is modulated by the variations in density of the object in the perpendicular direction. All of the light thus modulated by the object in the course of each such sweep is gathered, transmitted as a composite beam through a conventional optical train to a remote location, and there focused on a small aperture. The light passing through this aperture is again spread, in the first direction, into a spectrum that is focused in an image plane, and this spectrum is caused to scan the image plane in the perpendicular direction.

As is well known in the transmission of image signals by television techniques, it is imperative that the scanning operations at the receiver station be synchronized with those at the transmitter station, not only in frequency but in phase as well. The invention makes provision for such synchronization through optical means. To this end the momentary location, in the course of each sweep at the transmitter station of the initial spectrum on the object is coded in terms of the polarization condition of the incident light and the code is projected, over a control channel, to the receiver station. At the receiver station the polarization condition is recovered from the code and is utilized to control the local sweeping operations, in frequency and in phase.

Polarization control of synchronism can be accomplished in various ways. It is possible, in principle, to employ only plane polarized light and to arrange that its plane of polarization rotate, e.g., through a full revolution in the course of each single sweep and, with a servomechanism, to cause an analyzer to rotate at the same frequency and in the same phase. While such an arrangement would be adequate as between a transmitter station and a receiver station that always remain fixed in their attitudes as, for example, when both are solidly fixed to the earth, this arrangement is open to the objection that it fails in the case of communication between a ground-based station and a vehicle such as an airplane that is not so based, or between two such vehicles. This is for the reason that the polarization sensor at the receiver station is unable to distinguish between a change in attitude of the receiver station and a change in the plane of polarization of the light incident upon it. It is, therefore, preferred to employ, as an indication of the momentary phase of the transmitter scan, the degree of ellipticity of polarization of the incident light. To this end, the incident light is elliptically polarized and the ellipticity is varied from zero to unity in synchronism and in phase with the transmitter scan; i.e., the light is circularly polarized at one end of the scan, plane polarzed at the other end of the scan, and polarized with varying degrees of ellipticity at various intermediate stages of the scan. A control channel is provided that carries only the information as to the momentary ellipticity of polarization of the incident light. This control channel may advantageously be a single wavelength of the incident light, preferably at one end of the visible spectrum or the other, this single wavelength being excluded from the portion of the spectrum employed to represent the spatial coordinates of the object. At the receiver station the light of the control channel is passed through an analyzer that is arranged to give an alternating current output. The amplitude of this output current is modulated, more or less, accordingly as the ellipticity tends toward plane polarization or toward circular polarization. The envelope is detected; and the output wave of the detector is thus a measure of the momentary polarization condition of the light at the transmitter station, having an intermediate steady value for circular polarization, swinging at the analyzer frequency between a maximum magnitude and zero in the case of linear polarization, and swinging between intermediate limits for polarization of ellipticity intermediate between circular and linear. The envelope signal is now employed to control the scanning of the receiver station spectrum in the image plane.

The invention will be fully apprehended from the following description of illustrative embodiments, taken in connection with the appended drawings, of which:

FIG. 1 is a schematic diagram showing the transmitter portions of an optical image transmission system in accordance with the invention;

FIG. 2 is a schematic diagram showing the receiver portions of an optical image transmission system in accordance with the invention; and FIGS. 3 and 4 are schematic diagrams showing alternatives to the apparatus of FIGS. 1 and 2, respectively.

Referring now to the drawings, the light from a point source, e.g., a pinhole 3 in a shield 2 receiving the light of an incandescent lamp 1 or of the sun is gathered and collimated by a lens 4 and directed onto an interference filter 5 disposed in a plane at an angle to the incident beam. The interference filter 5, a component well known per se, passes a single wavelength component, here designated $\lambda_c$, to which the filter 5 is tuned, reflecting components of all other wavelengths toward a pivoted nonselective mirror 6 which, in turn, directs them toward a disperser 7 of which the principal component may be a prism 8 or a grating which disperses the incident light into a spectrum. Such units are well known in the art, and each such unit normally includes an exit lens 9 to bring the dispersed light into focus in a plane where the various wavelengths are spaced apart laterally. To avoid confusion of the drawings, the mean refraction angle has been eliminated, so that the plane in which the spectrum is focused is perpendicular to the direction of the incident rays. The light appears in this plane as a narrow line 11 of which the color varies progressively from end to end, the violet light (V) having been refracted the most and the red light (R) the least. Narrowness is secured by employment of a point source of light, i.e., a very small pinhole 3, and by ensuring that all the elements of the optical system be stigmatic. More exactly, the dimensions of the "very small" pinhole 3 are such that a monochromatic image, in the object plane, is no larger than a single picture element.

An object whose image is to be projected, here illustrated as a transparent film 12 bearing a cross 13, in which the transparency of the cross 13 has one value while that of the background has a different value, is disposed in the focal plane of the exit lens 9, i.e., in the plane of the narrow spectrum 11. This narrow spectrum coincides with a single selected line of the object 12, 13 shown, for illustration, as the center line. Hence, the light passing through the film 12 consists of a large number of recognizably different wavelengths, and each wavelength corresponds uniquely to a single element of the selected line of the object 12, 13. The intensity of each emergent wavelength, moreover, is dependent on the density of that element of the object film 12 through which it passes, and which that wavelength identifies.

The light of the spectrum 11 as thus modified by the object 12, 13, is gathered by a field lens 14 and light is transmitted toward the receiver station as a composite beam 15, i.e., a bundle of rays of many different wavelengths, each of a strength or brightness determined by that element of the object film 12 through which it has passed.

In accordance with the invention the narrow spectrum line 11 generated by the disperser 7 is swept across the object film 12 in a direction perpendicular to its length; i.e., if, as indicated, the spectrum extends from side to side of the film 12 in the horizontal direction, the sweeping movement takes place in the vertical direction. Preferably, the movement takes place at uniform speed throughout each single sweep and the spectrum is abruptly returned, at the end of each sweep, to its starting position. Such a sweeping movement is conveniently instrumented by a mechanical generator 18 proportioned to deliver, on its output shaft 19, which bears the nonselective mirror 6, angular movements of sawtooth wave form and of a suitable frequency, for example, twenty cycles per second, thus to cause the mirror 6 to rock about the indicated axis.

To avoid the necessity of providing the disperser 7 with a prism 8 and an exit lens 9 of inconveniently large apertures, the rocking mirror 6 should be placed as close as possible to the disperser 7, so that the desired angular change in the angle of incidence of the light beam on the disperser 7 shall be accompanied by a minimum of lateral sweep of the beam across it.

Passing, for the present, the control channel of the wavelength $\lambda_c$ and the instrumentalities associated with it, the main composite beam 15, projected by the field lens 14 toward the receiver station shown in FIG. 2, is there gathered by a camera lens 21 and projected onto a small aperture or pinhole 22 in a shield 23. This pinhole 22 thus receives light from the entire spectrum 11. The light passing through this pinhole 22 is collimated by a lens 24 and directed onto a second interference filter 25 which may be identical with the filter 5 at the transmitter station. It therefore passes only light of wavelength $\lambda_c$ and reflects light of all the other wavelengths of the spectrum toward a pivoted mirror 26 which, in turn, reflects it onto a disperser 27 which may be identical with the disperser 7 at the transmitter station. As in the case of FIG. 1, the mirror 26 should be located as close as possible to the disperser 27. This disperser 27 spreads the light into a single narrow line spectrum 31, identical with that at the transmitter station and extended in the horizontal direction, while the exit lens 29 of the disperser 27 brings this narrow spectrum line 31 to focus in an image plane.

If it is desired to observe the image thus developed directly, a viewing screen may be placed in this image plane. For reasons that will appear in the sequel, controllable intensification of the image offers certain advantages. Accordingly, it is preferred to interpose an image intensifier tube 35 and to locate its photocathode screen face 36 in the image plane, and to focus the narrow spectrum 31 on, and to sweep it over, the surface of this photocathode 36. With this arrangement the image is ultimately viewed on the electrosensitive screen 37 of the intensifier tube 35.

The narrow spectrum 31 developed as described above and focused in the image plane contains light of a large number of distinguishably different colors, each in an intensity dependent on that part of the object film 12 at the transmitter station through which it passed. By rocking the pivoted mirror 26 on its pivot, this spectrum is caused to sweep the image plane, and hence the photocathode face 36, in a direction perpendicular to the length of the spectrum, i.e., the vertical direction, so that, provided the sweeping operations at the two stations are properly coordinated, an image 38 of the object is reproduced on the electrosensitive screen 37 of the image intensifier tube 35. Because the spectrum 11 is shown after completion of one half its sweep over the object film 12, only one half of the image 38 is shown.

This image is in color, but not natural color. By virtue of the color-coding principle here turned to account, the color of each element of the image 38 represents, not the color, but rather the location, of the corresponding element of the object 12, 13. For this reason the object film 12 itself is preferably colorless.

The coordination between the sweeping operations at the transmitter and those at the receiver is carried out, according to the invention as follows. As shown in FIG. 1, a polarizer, e.g., a sheet 46 of plastic matrial containing a large number of minute, similarly oriented crystals and sold under the name "Polaroid," is placed in the path of the beam which passes through the filter 5. Following this is a quarter wave plate 47, i.e., a slab of birefringent crystalline material that introduces a relative retardation of $$\frac{\lambda_c}{4}$$

between light vibrations that are polarized in one plane and those that are polarized in a perpendicular plane. The polarizer 46 is cyclically rotated, i.e., it is rocked about its axis, under the influence of the angle generator 18, through an angle of forty-five degrees and at constant speed and thereupon abruptly returned to its starting orientation. Common control, by the same angle generator 18, of the sawtooth rocking movements of the mirror 6 and of the polarizer 46 ensures full coordination of these movements in phase, as well as in frequency. Since the mirror 6 swings through whatever angle is required to move the narrow spectrum across the object film 12, while the polarizer 46 is required to rotate through forty-five degrees, an amplitude-adjusting mechanism, here shown as a gear box 48, is included between the angle generator 18 and the shaft that controls the movements of the polarizer 46.

The quarter wave plate is oriented with its axis parallel to the plane of polarization of the light passing through the polarizer 46 at one extreme of the movement of the latter and at forty-five degrees to the polarization plane at the other extreme.

The angular movement of the polarizer 46 then operates to vary the ellipticity of polarization of the emergent light 45. The ellipticity is defined as $$E=\frac{a-b}{a}$$

where $a$ and $b$ are the major and the minor axes of the ellipse, respectively. When the angular position of the polarizer 46 is varied as described in the previous paragraph, the ellipticity varies between unity and zero. Specifically, when the axis of the polarizer 46 is parallel to that of the quarter wave plate 47, the emergent light 45 is plane polarized; i.e., its ellipticity is unity; and when the two axes are angularly displaced by forty-five degrees, the emergent light 45 is circularly polarized; i.e., its ellipticity is zero. For intermediate angular displacements, the ellipticity of the emergent light has intermediate magnitudes. Thus a steady change, throughout each sweep, of the angular displacement of the polarizer 46 between zero and forty-five degrees makes for a coordinated steady change in the ellipticity of the emergent light, between the magnitude zero and the magnitude unity.

The control beam 45, of wavelength $\lambda_c$ and modulated in its ellipticity of polarization as described above, is projected, along with the principal beam 15, which consists of many image-defining components of different wavelengths, to the receiver station (FIG. 2). There, an interference filter 25 separates it from the image-defining components of the beam 15, whereupon it is directed through a spinning analyzer 51 and, by way of a lens 52, onto a photoelectric cell 53. The analyzer 51, e.g., a disc of "Polaroid," is spun by a motor 54 about an axis parallel with the control beam, at a speed that is high compared with the sweep frequency, e.g., at 200 revolutions per second.

The current output of the photoelectric cell 53 is a measure of the intensity of the light incident upon it. The steady component of this output current is blocked by a condenser 55 while its alternating current components are brought to suitable levels by an amplifier 56, preferably one whose gain is dependent on a control signal applied to a control terminal 57. The output of this amplifier is applied to a conventional detector 58, followed by a low-pass filter 59, which suppresses its high frequency components and so recovers the modulation envelope wave. The output of the filter 59, after being brought by an amplifier 60 to a suitable amplitude level, is applied to a galvanometer movement 61 whose output shaft controls the rocking of the scanning mirror 26. A shaper 62 may be included to bring the wave passing the amplifier 60 to true sawtooth form, thus offsetting the influences of any departures from linearity of other components.

The mode of operation of the control mechanism is as follows. Suppose, for instance that, at a particular instant, the light of the control beam 45, of frequency $\lambda_c$, is plane-polarized. When the transmission axis of the analyzer 51 is parallel to the plane of polarization, it passes the light with negligible attenuation. When the transmission axis of the analyzer is at 90 degrees to the plane of polarization, it obscures the light substantially completely. The first condition changes to the second in one quarter revolution of the analyzer. In the second quarter revolution the transmitted intensity rises to its maximum again. The same conditions are repeated for the second half revolution of the analyzer. Hence, the intensity of the light incident on the photocell 53 is varied from zero to a maximum value twice in each revolution of the analyzer.

When, to the contrary, the incident light is circularly polarized, the obscuring of one of its components by the analyzer 51 for any orientation of the latter is offset by the transmission of the other component, so that the strength of the light incident on the photocell 53 is independent of the angular position of the spinning analyzer 51. Hence the current output of the photocell 53 contains no alternating components. Under intermediate conditions, when the incident light is elliptically polarized, the light incident on the photocell 53 varies, at twice the frequency of the rotation of the analyzer 51, between a lower limit of strength greater than zero and an upper limit of strength less than maximum. Thus the variation of the ellipticity of polarization of the control beam 45, in synchronism with the transmitter sweep, gives rise to a photocell output current, at the receiver station, that alternates at twice the frequency of rotation of the analyzer 51 and of which the envelope is a wave of approximately sawtooth form in synchronism with the transmitter sweep. After recovery and the shaping of this envelope wave in the fashion described above, it controls the vertical sweep of the recovered spectrum 31 across the image of plane 36. The gain of the amplifier 60 is adjusted in any convenient fashion, here indicated by a manual control, to cause the received spectrum 31 to sweep through such a distance in the vertical dimension of the image plane 36 as to give a desired amount of vertical magnification.

While an intervening light-scattering medium does not affect wavelength, and hence does not affect resolution in the received image, it may, nevertheless, greatly reduce the strength of the incident light. This reduction is reflected in the reproduced image as a loss of contrast and, in the control channel, as a loss of current strength. In order that the detector-filter combination, 58, 59 shall deliver the modulated envelope of the control channel signal unaffected by such influences, it is desirable that such reductions of strength be compensated. This may conveniently be achieved by a bypath containing a rectifier 64 followed by a low-pass filter 65, to derive an auxiliary control signal that is proportional to the strength of the incoming control beam 45, unaffected by its modulation. This auxiliary control signal is applied to the gain-control terminal 57 of the amplifier 56 in a sense to reduce its gain when the incoming signal is strong and to increase it when the incoming signal is weak. With this provision, the signal applied to the detector 58 is substantially unaffected by an intervening light-scattering medium.

In addition to the intensification which it provides, the interposition of the image intensifier 35 offers the following advantage. Fluctuations in intensity of the final image that may be due to fluctuations of the light-scattering properties of the intervening medium may be offset, at least partially, by application of the same gain-control signal over an auxiliary path 66 to a gain-control terminal 67 of the image intensifier tube 35.

FIGS. 3 and 4 show alternatives to the apparatus of FIGS. 1 and 2, respectively, in which the moving elements of the former figures have been replaced by electronic counterparts. Thus, the fixed point source 3, of FIG. 1 is replaced, in FIG. 3, by a spot of light 71 that appears on the face of a cathode ray oscilloscope 72 when the face is impacted by a thin pencil of electrons, while the rocking mirror 6 and the angle generator 18 are replaced by the movement that this spot undergoes when the sawtooth wave output of a voltage generator 73 is applied to the deflecting elements of the oscilloscope 72, causing the spot to move across the face at uniform speed, returning abruptly to zero at the end of each sweep. The rocking polarizer 46 and the quarter wave plate 47 of FIG. 1 are replaced, in FIG. 3, by a Kerr cell to whose electrodes the sawtooth wave voltage of the generator 73 is applied and a polarizer 75 ahead of the Kerr cell 74 with its axis at forty-five degrees to the axis of the Kerr field. The length of the Kerr cell and the strength of the applied electric field may be proportioned, in well known fashion, to cause the emergent light to shift steadily, in the course of each sweep, between circular polarization and linear polarization, returning abruptly to its starting condition. To prevent the auxiliary beam from swinging with the movement of the light spot 71, an auxiliary stationary point source 76 may be employed, of wave length the same as that removed from the principal beam 15 by the interference filter 5.

The pivoted mirror 26 of FIG. 2 is replaced, in FIG. 4, by employing, instead, a fixed mirror 26', thus allowing the image spectrum 31 to remain fixed on the cathode face 36 of the image converter tube 35. Its electron image counterpart 81 is then caused to sweep across the electrosensitive viewing screen 37 of the tube 35. To this end, the tube 35 may be provided with electron beam-deflecting elements 82, 83 to which the sawtooth sweep wave developed by the elements 53–62 is applied. The spinning analyzer 51 of FIG. 2 is replaced, in FIG. 4, by the combination with a fixed analyzer 84, of a Faraday magneto-optic rotator comprising a cylinder 85 of a suitable material, e.g., heavy flint glass, surrounded by a coil 86 to which a locally generated wave of suitable frequency, e.g., 400 cycles per second, is applied from a generator 87. A rotator of this kind is described by Jenkins and White in "Fundamentals of Physical Optics" (McGraw-Hill, 1937) at page 426.

The strength of the magnetic field developed by the coil 86 is to be proportioned, e.g., by an amplifier 88, in coordination with the length of the cylinder 85 to drive the resulting Faraday rotation through a range of at least 180 degrees from 90 degrees in one sense to 90 degrees in the other sense.

Either of the foreging arrangements permits the development, at a remote location, of an image of a nearby object when the light is so scattered by an intervening medium as to reduce the definition of an image developed in the conventional way to such a point that no element of a single line of the image can be distinguished from any other element.

When the scattering by the intervening medium is less severe so that, with a conventional optical train some resolution remains in the image, a further refinement is possible. Suppose, for example, that each single line of the object contains one thousand distinguishable elements and that the intervening medium is such that, with a conventional optical train only ten elements can be distinguished in the image; then, for each distinguishable element of the image, the invention contemplates spreading the light originating at the corresponding point of the object into a single spectrum and stacking ten such spectra end to end along a single line in the direction of color dispersion. By dint of the wavelength encoding described above, the individual elements within each single region of confusion in the conventional image may be resolved by uniquely associating each of them with a particular light wavelength, while the individual elements of the next region of confusion may be similarly resolved by a second spectrum disposed end to end with the first, and so on. Such an arrangement of the successive spectra may be secured with a succession of dispersing elements or by means of an interferometer. This refinement does not alter the necessity for scanning at both stations and for synchronization as between the scanning operations. Nor does it alter the instrumentalities provided in the figures for deriving a control signal representative of transmitter scanning phase and for utilizing this control signal for the coordination of the receiver scanning phase.

What is claimed is:

1. In an image transmission system wherein, at a nearby location, a first scanning element sweeps over an object field to derive image signals, said image signals are transmitted to a remote location and, at said remote location, a second scanning element, modulated by said image signals, sweeps over an image plane to reconstruct an image, means for synchronizing the movements of the second scanning element with those of the first scanning element which comprises a source of light, means for variably polarizing said light in unambiguous relation to the sweeps of said first element, means for projecting said variably polarized light to said remote location and, at said remote location, means for recovering from said polarized light a control signal that varies in synchronism with the movements of said first scanning element, and means for governing the sweeps of said second scanning element in synchronism with the variations of said control signal.

2. Apparatus defined in claim 1 wherein said polarization-varying means comprises means for elliptically polarizing the light of said source, and means for progressively varying the ellipticity of said polarization, in related conformance with the movements of said first scanning element, between a condition of circular polarization and a condition of plane polarization.

3. Apparatus as defined in claim 1 wherein said polarization-varying means comprises a polarizing element and a quarter wave retardation element disposed in the path of said light in the order named, and means for progressively rotating one of said elements with respect to the other between an orientation for which the transmission axis of the polarizing element is parallel with one of the principal axes of the retardation element and an orientation that is angularly displaced by 45 degrees from said first-named orientation.

4. Apparatus as defined in claim 1 wherein said polarization-varying means comprises a polarizing element having a polarization axis, and a Kerr cell disposed in the path of said light in the order named, said Kerr cell comprising a controllably birefringent medium and two electrodes disposed on opposite sides of said medium on a line extending at 45 degrees to said polarization axis, a source of a potential that varies progressively between a zero magnitude and a peak magnitude conformably with each sweep of said first scanning element, and connections for applying said varying potential to said electrodes, the peak magnitude of said potential and the optical length of said medium being proportioned to introduce a relative retardation of one quarter wavelength between two orthogonally vibrating components of an emergent light wave.

5. Apparatus as defined in claim 1 wherein said control signal recovering means comprises means responsive to the ellipticity of polarization for recovering an electrical wave of which the magnitude varies in related conformance with said ellipticity.

6. Apparatus as defined in claim 2 wherein said control signal recovering means comprises a polarization analyzer disposed in the path of a beam of elliptically polarized light, means for rotating said analyzer about the beam axis at a rate that is high compared with the frequency of said polarization variation, and a photoelectric cell disposed to receive light emerging from said rotating element, whereby the current output of said cell comprises a subcarrier, of a frequency twice the rotation rate of said analyzer, modulated in amplitude with an envelope representative of the sweeps of said first scanning element, and a detector for recovering said envelope.

7. Apparatus as defined in claim 2 wherein said control signal recovering means comprises a Faraday magneto-optic rotator and a fixed analyzer disposed, in the order named, in the path of an incoming light beam that is polarized with varying ellipticity, said rotator having an axis that is collinear with said beam, and means for applying to said rotator an axial magnetic field of a frequency that is high compared with the frequency of said polarization variation, the peak strength of said field and the optical length of said rotator being proportioned to sweep the ellipse that momentarily defines the polarization of said beam through an angle of at least 180 degrees, and a photoelectric cell disposed to receive light emerging from said analyzer, whereby the current output of said cell, representative of the intensity of the light impinging on it, comprises a subcarrier of a frequency dependent on that of said applied magnetic field, modulated in amplitude with an envelope representative of the ellipticity of said polarization, and a detector for recovering said envelope.

8. Image transmission apparatus which comprises a source of a narrow beam of polychromatic light, means for diverting the light of a preassigned wavelength $\lambda_c$ from said beam, means for spreading the remaining wavelengths of said beam into a spectrum, means for selectively illuminating the several elements of a single line of an object field with the successively different wavelengths of said spectrum, means for progressively sweeping said illumination over said field in a direction substantially perpendicular to said line, means for modulating light of said diverted wavelength $\lambda_c$ in coordination with said sweeping operation to provide a control signal, means for together transmitting the light of said field as thus illuminated and the light of said wavelength $\lambda_c$ as thus modulated as a composite beam to a remote location, means at said remote location for receiving said composite beam, means for dverting light of said wavelength $\lambda_c$ from said received beam, means for directing the undiverted light of said received beam into an image field in a fashion to selectively illuminate the adjacent elements of a single line of said image field with successively different wavelengths of said light, means for progressively sweeping said image line illumination over said image field in a direction substantially perpendicular to said image line, means for recovering the modulation envelope of the light diverted from said composite beam, means for developing from said recovered envelope a signal that varies in synchronism with the operations of said first-named sweeping means, and means for governing the operations of said image line sweeping means in synchronism with the variations of said last-named signal.

9. Image transmission apparatus which comprises a source of a narrow beam of polychromatic light, means for diverting the light of a preassigned wavelength $\lambda_c$ from said beam, means for spreading the remaining wavelengths of said beam into a spectrum, means for selectively illuminating the several elements of a single line of an object field with the successively different wavelengths of said spectrum, means for progressively sweeping said illumination over said field in a direction substantially perpindicular to said line, means for modulating light of said wavelength $\lambda_c$ in coordination with said sweeping operation to provide a control signal, and means for together transmitting the light of said field as thus illuminated and the light of said wavelength $\lambda_c$ as thus modulated as a composite beam to a remote location.

10. Apparatus for reconstituting an image from a composite beam of light including a plurality of different wavelengths all but one of which are modulated with message information developed at a remote location by dispersion of white light into a spectrum extending along one dimension of an object and with the aid of a scanning element that causes repeated systematic movements of said spectrum over said object in the perpendicular dimension, while the remaining one of said wavelengths, $\lambda_c$, is endowed with a modulation envelope that varies in unambiguous relation to the movements of said element which comprises means for receiving said composite beam, means for diverting light of said wavelength, $\lambda_c$, from said received beam, means for directing the undiverted light from said received beam into an image field in a fashion to selectively illuminate the adjacent elements of a single line of said image field with successively different wavelengths of said light, means for repeatedly sweeping said image line illumination over said image field in a direction substantially perpendicular to said image line, means for recovering the modulation envelope of said diverted light, means for developing from said recovered envelope a signal that varies in synchronism with the movements of said scanning element, and means for governing the operations of said image line sweeping means in synchronism with the variations of said last-named signal.

References Cited by the Examiner

UNITED STATES PATENTS

| | | | |
|---|---|---|---|
| 1,354,932 | 10/20 | Wilson | 250—199 |
| 2,443,258 | 6/48 | Lindenblad | 88—1 |
| 2,707,749 | 5/55 | Mueller | 250—199 |

FREDERICK M. STRADER, *Primary Examiner.*

JEWELL H. PEDERSEN, *Examiner.*